(12) United States Patent
Yamamoto et al.

(10) Patent No.: US 9,133,896 B2
(45) Date of Patent: Sep. 15, 2015

(54) ROLLER-TYPE ONE-WAY CLUTCH

(71) Applicant: NSK-WARNER K.K., Shinagawa-ku, Tokyo (JP)

(72) Inventors: Norihiro Yamamoto, Fukuroi (JP); Hiroyuki Ohishi, Fukuroi (JP)

(73) Assignee: NSK Warner K.K., Tokyo (JP)

( * ) Notice: Subject to any disclaimer, the term of this patent is extended or adjusted under 35 U.S.C. 154(b) by 0 days.

(21) Appl. No.: 14/474,134

(22) Filed: Aug. 30, 2014

(65) Prior Publication Data
US 2015/0068859 A1 Mar. 12, 2015

(30) Foreign Application Priority Data

Sep. 10, 2013 (JP) ................................. 2013-187469

(51) Int. Cl.
*F16D 41/067* (2006.01)
*F16D 41/066* (2006.01)
F16D 41/06 (2006.01)

(52) U.S. Cl.
CPC ............ *F16D 41/066* (2013.01); *F16D 41/067* (2013.01); *F16D 2041/0601* (2013.01)

(58) Field of Classification Search
CPC ..................... F16D 2014/0601; F16C 2361/43
USPC .......................................... 192/45.011, 113.2
See application file for complete search history.

(56) References Cited

U.S. PATENT DOCUMENTS

| 3,087,589 | A | * | 4/1963 | Gorsky ................. 192/45.019 |
| 5,372,227 | A | * | 12/1994 | Kinoshita et al. ......... 192/45.011 |
| 5,601,175 | A | * | 2/1997 | Kinoshita et al. ......... 192/113.32 |
| 6,079,534 | A | * | 6/2000 | Ando .......................... 192/45.1 |
| 2010/0051402 | A1 | * | 3/2010 | Yamamoto ...................... 192/45 |

FOREIGN PATENT DOCUMENTS

| JP | 2001-159432 A | 6/2001 |
| JP | 2002-089590 A | 3/2002 |
| JP | 2005-016555 A | 1/2005 |
| JP | 2010-078141 A | 4/2010 |
| JP | 2011-047481 A | 3/2011 |

OTHER PUBLICATIONS

Office Action issued Jul. 23, 2015, in Japanese Patent Application No. 2013-187469.

* cited by examiner

*Primary Examiner* — Richard Lorence
(74) *Attorney, Agent, or Firm* — Miles & Stockbridge P.C.

(57) ABSTRACT

In a roller type one-way clutch comprising: an outer race; an inner race that is apart from the outer race on an inner diameter side in a radial direction and concentrically arranged to allow its relative rotation; a plurality of rollers that are arranged between the outer race and the inner race and transmit a torque between the outer race and the inner race; and a plurality of block bearings that are arranged between the rollers and between the outer race and the inner race, the roller type one-way clutch is characterized in that a curvature in a circumferential direction of a bearing surface of the block bearing facing an outer peripheral surface of the inner race is higher than a curvature in the circumferential direction of the outer peripheral surface of the inner race.

8 Claims, 4 Drawing Sheets

ROLLER-TYPE ONE-WAY CLUTCH

BACKGROUND OF THE INVENTION

1. Field of the Invention

The present invention relates to a roller type one-way clutch that is used for an automatic transmission or the like and has a roller that transmits torque interposed between an inner race and an outer race. In more detail, the present invention relates to an improved roller type one-way clutch having a block bearing.

2. Description of the Related Art

A roller type one-way clutch that is one type of one-way clutches is configured to lock rotation in one way by pressing a roller to mesh with a cam surface provided on an inner peripheral surface of an outer race or an outer peripheral surface of an inner race.

Japanese Patent Application Laid-Open No. 2011-47481 discloses an example of a prior art roller type one-way clutch provided with a block bearing. In Japanese Patent Application Laid-Open No. 2011-47481, an accordion spring is allowed to bear an energizing load that can prevent a roller from coming off in a sub-assembly state. Further, there is also disclosed a roller type one-way clutch that has a gap provided between a locking convex portion of the block bearing and a concave groove of an outer race, assures a rollable distance of a roller when an entire cage rotates a distance corresponding to the gap in the circumferential direction at the time of loading predetermined torque, and has a function of transmitting torque while reducing drag torque.

Furthermore, Japanese Patent Application Laid-Open No. 2005-16555 discloses a roller type one-way clutch in which a block bearing is interposed as bearing means between an outer race member and an inner race member and a gap between a stationary member and the outer race member is set to be smaller than a gap between a rotary member and an inner race member. As a result, when an arc-shaped support reference surface provided on the outer race member is regulated and supported, positioning in the radial direction is carried out, and wear of the rotary member and others can be reduced.

However, in each of the roller type one-way clutches disclosed in Japanese Patent Application Laid-Open No. 2011-47481 and Japanese Patent Application Laid-Open No. 2005-16555, the block bearing itself produces the drag torque. Each of Japanese Patent Application Laid-Open No. 2011-47481 and Japanese Patent Application Laid-Open No. 2005-16555 still has a problem that the drag torque produced from the block bearing cannot be sufficiently reduced.

SUMMARY OF THE INVENTION

Therefore, it is an object of the present invention to provide a roller type one-way clutch with reduced drag torque that is produced by a block bearing.

To achieve this aim, according to the present invention, there is provided a roller type one-way clutch including:

an outer race;

an inner race that is apart from the outer race on an inner diameter side in a radial direction and concentrically arranged to allow its relative rotation;

a plurality of rollers that are arranged between the outer race and the inner race and transmit torque between the outer race and the inner race; and a plurality of block bearings that are arranged between the rollers and between the outer race and the inner race, wherein a curvature in a circumferential direction of an inner radial surface of the block bearing facing an outer peripheral surface of the inner race is higher than a curvature in the circumferential direction of the outer peripheral surface of the inner race.

According to the present invention, the following effects can be provided.

Since a large clearance of an inlet and an outlet for an oil on an interface of the block bearing and the inner race can be assured, an increase in shearing resistance of the oil can be suppressed, and hence drag torque can be reduced.

Since the curvature in the circumferential direction of the inner radial surface of the block bearing facing the outer peripheral surface of the inner race is set to be higher than the curvature in the circumferential direction of the outer peripheral surface of the inner race, an increase in shearing resistance of the oil can be suppressed, and hence the drag torque can be reduced.

Further features of the present invention will become apparent from the following description of exemplary embodiments with reference to the attached drawings.

DESCRIPTION OF THE EMBODIMENTS

Figure 1:
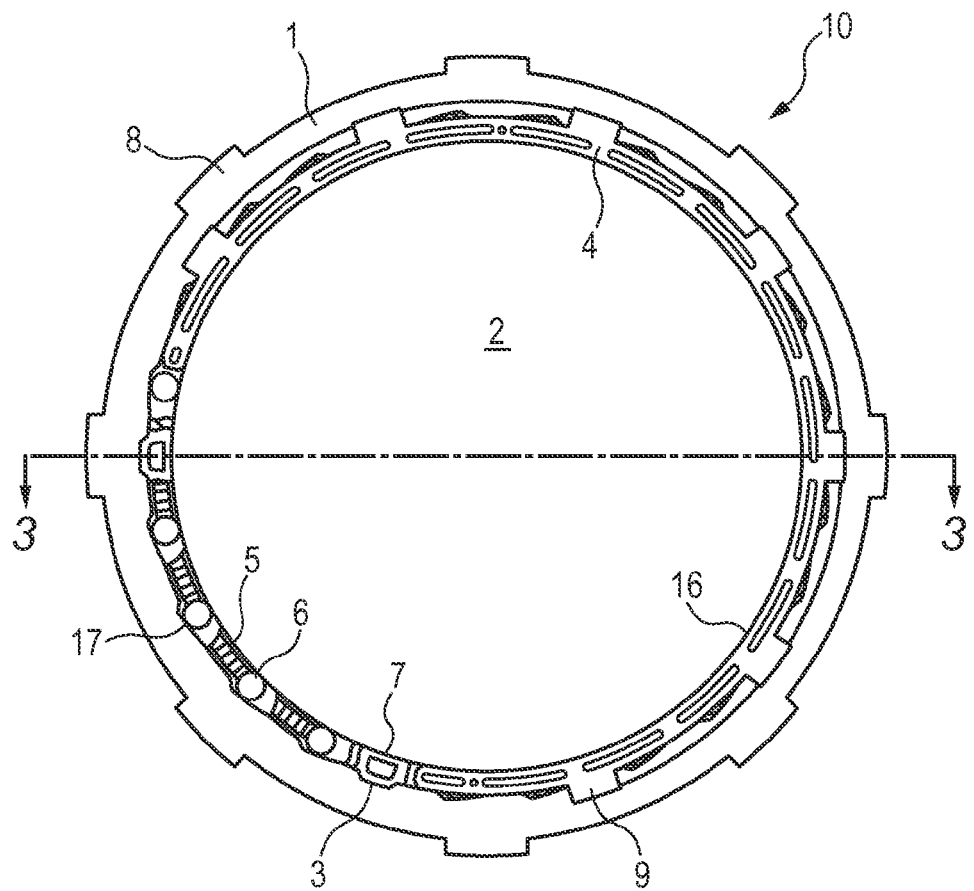
FIG. 1 is a partially cutaway front view of a roller type one-way clutch according to an embodiment of the present invention.

Preferred embodiments of the present invention will now be described hereinafter in detail with reference to the accompanying drawings. It is to be noted that like reference numerals denote like parts throughout the drawings.

FIG. 1 is a partially cutaway front view showing a roller type one-way clutch according to the present invention. The roller type one-way clutch 10 is a solid shaft member and constituted of an inner race 2 including an outer peripheral surface 16 and a substantially annular outer race 1 having the inner race 2 fitted on an inner diameter side thereof. The outer race 1 includes a plurality of claws 8 equally provided in the circumferential direction on an outer peripheral surface thereof, and it can be fitted to a corresponding member (not shown) through the claws 8.

Block bearings 7, rollers 6, and springs 5 that provide the rollers 6 with energizing force in a meshing direction are arranged between the inner race 2 and the outer race 1. The outer race 1 has a cam surface 17 on an inner peripheral surface thereof, and it is configured to lock rotation when the rollers 6 mesh with this cam surface 17.

Further, the rollers 6 and the springs 5 that transmit torque and a cage (not shown) that holds the rollers 6 are provided between the outer race 1 and the inner race 2. Furthermore, the block bearings 7 that position the cage with respect to the outer race 1 are provided between the inner race 2 and the outer race 1. The block bearings 7 have a bearing function for the inner race 2 and the outer race 1.

The plurality of rollers 6, springs 5, and block bearings 7 are provided in the circumferential direction as shown in FIG. 1. Four sets of the rollers and the springs 5 are provided between the block bearings 7 equally arranged in the circumferential direction. Additionally, an annular side plate 4 is provided on each end face of the roller type one-way clutch 10 in the axial direction. The side plate 4 includes claw portions 9 protruding toward the outside in the radial direction and abuts on an end face of the outer race 1 in the axial direction at the claw portions 9.

Figure 2:
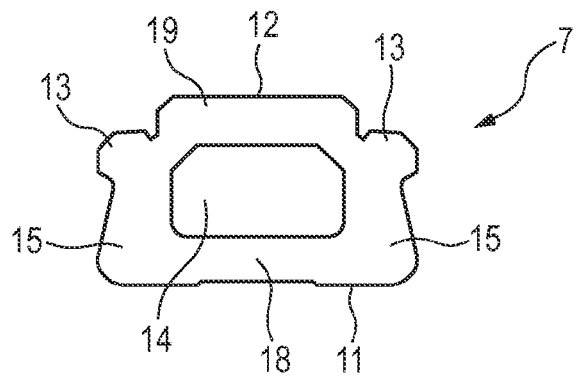
FIG. 2 is a front view of a block bearing.

FIG. 2 is a front view of the block bearing. The trapezoidal block bearing 7 includes a bottom portion 18 having a bearing surface 11 that exercises a bearing function when it slides on an outer peripheral surface 16 of the inner race 2, an upper portion 19 having an upper surface 12 that faces the bearing surface 11, and side portions 15 that couple the upper portion 19 with the bottom portion 18. The block bearing 7 includes a hole 14 axially pierced in a portion surrounded by the upper portion 19, the bottom portion 18, and the two side portions 15 and two arm portions 13 provided between the side portions 15 and the upper portion 19.

The upper surface 12 of each block bearing 7 is fitted in a groove 3 provided on the inner peripheral surface of the outer race 1. Therefore, each block bearing 7 can move in the axial direction, but it is held between the outer race 1 and the inner race 2 in a state that its movement in the circumferential direction is restricted. Upper surfaces of the two arm portions 13 function as a bearing for the inner peripheral surface of the outer race 1, and the bearing surface 11 functions as a bearing for the outer peripheral surface 16 of the inner race 2.

Figure 3:
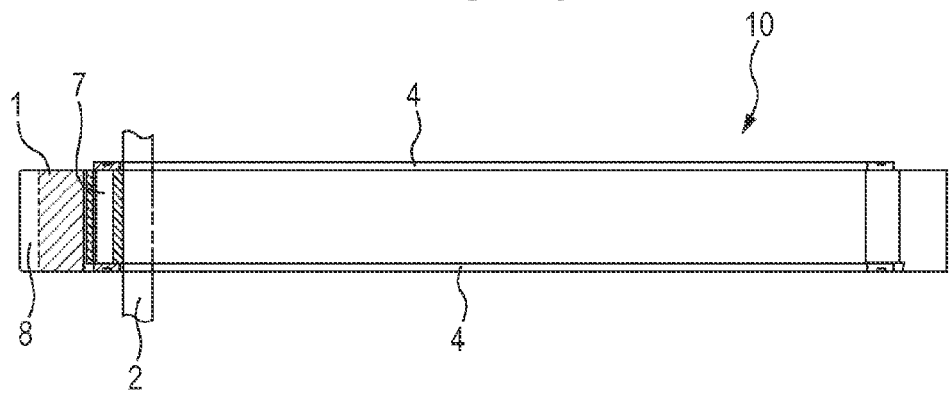
FIG. 3 is a cross-sectional view taken along a line 3-3 in FIG. 1.
Figure 4:
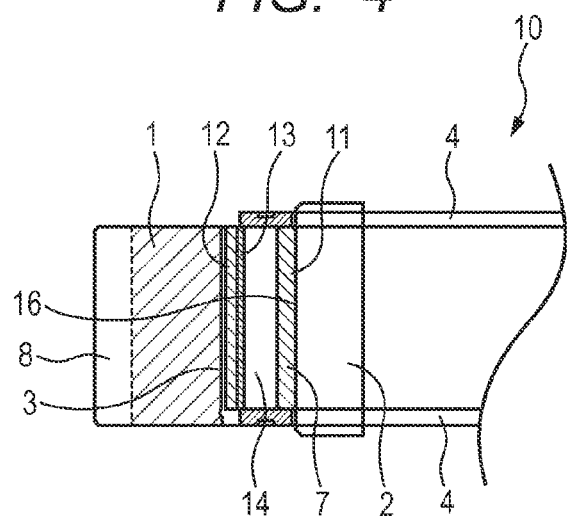
FIG. 4 is a partially enlarged view of FIG. 3.

FIG. 3 is a cross-sectional view taken along a line 3-3 in FIG. 1, and FIG. 4 is a partially enlarged view of FIG. 3. It is to be noted that, in each of FIG. 3 and FIG. 4, the inner race 2 is shown in a schematic view.

As shown in FIG. 3 and FIG. 4, the upper portion 19 of each block bearing 7 is fitted in the groove 3 of the outer race 1, and the bearing surface abuts on the outer peripheral surface 16 of the inner race 2. The roller type one-way clutch 10 has the side plates 4 arranged on both ends in the axial direction and holds constituent elements, e.g., the rollers 6, the springs 5, and the block bearings 7 so that they cannot come off in the axial direction.

Figure 5:
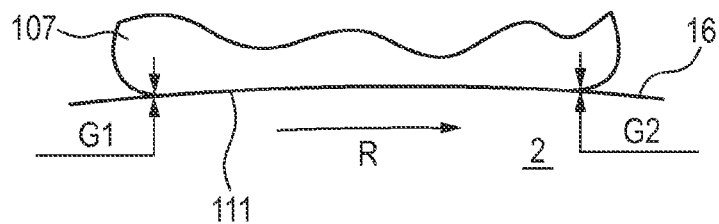
FIG. 5 is an axial partial cross-sectional view showing a relationship between a block bearing and an inner race according to the prior art.
Figure 6:
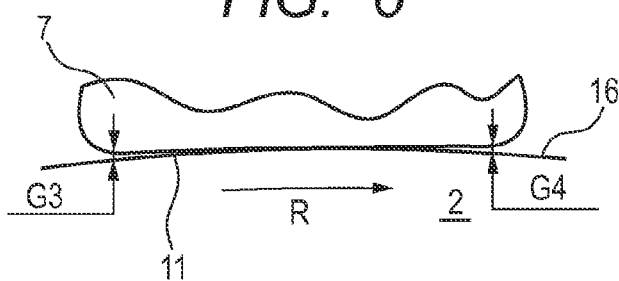
FIG. 6 is an axial partial cross-sectional view showing a relationship between a block bearing and an inner race according to the present invention.

FIG. 5 is an axial partial cross-sectional view showing a relationship between a block bearing and an inner race according to the prior art, and FIG. 6 is an axial partial cross-sectional view showing a relationship between the block bearing and the inner race according to the present invention. In FIG. 5, since a bearing surface 111 and an outer peripheral surface 16 have substantially the same curvatures, there is almost no clearance between an inlet gap G1 serving as an inlet for an oil (a lubricant) and an outlet gap G2 from which the oil exits between the bearing surface 111 of a block bearing 107 and the outer peripheral surface 16 of the inner race 2.

On the other hand, as shown in FIG. 6, in the roller type one-way clutch 10 according to the present invention, an inlet gap G3 serving as an inlet for the oil and an outlet gap G4 from which the oil exits are defined between the bearing surface 11 of the block bearing 7 and the outer peripheral surface 16 of the inner race 2 due to a difference in curvature between the bearing surface 11 and the outer peripheral surface 16. In each of FIG. 5 and FIG. 6, the inner race 2 rotates in a direction indicated by an arrow R.

In comparison with FIG. 5 showing the relationship between the block bearing and the inner race according to the prior art, a sufficiently large clearance is produced between the block bearing and the inner race according to the present invention shown in FIG. 6. It can be understood that the inlet gap G3 and the outlet gap G4 are larger than the inlet gap G1 and the outlet gap G2 according to the prior art. That is, a relationship of G3>G1 and G4>G2 is achieved. That is because the curvature of the bearing surface 11 of the block bearing 7 in the circumferential direction is set to be larger than the curvature of the outer peripheral surface 16 of the inner race 2 in the circumferential direction.

The curvature in the circumferential direction of the bearing surface of the block bearing facing the outer peripheral surface of the inner race is double to quintuple the curvature in the circumferential direction of the outer peripheral surface of the inner race. Since the inlet gap G3 and the outlet gap G4 can be set to be larger than the counterparts in the prior art as described above, an increase in shearing resistance of the oil can be suppressed, and drag torque can be reduced.

Figure 7:
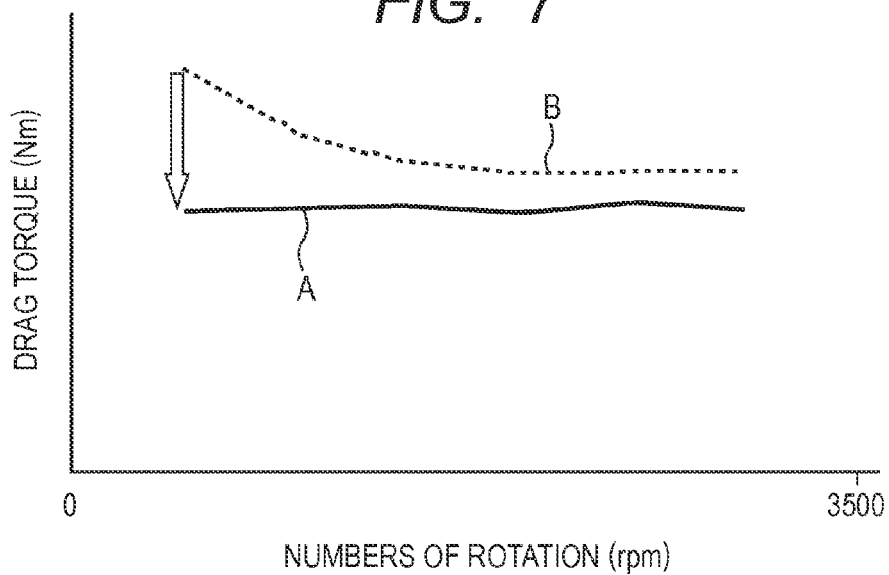
FIG. 7 is a graph showing a comparison between drag torque of the roller type one-way clutch according to the present invention and that according to the prior art.

FIG. 7 is a graph showing a comparison between drag torque of the roller type one-way clutch according to the present invention and that according to the prior art. A is provided by the present invention, and B is provided by the prior art. In the present invention, the drag torque takes substantially constant low values from a low-revolution area to a high-revolution area. On the other hand, according to the prior art, it can be understood that the drag torque that is greatly higher than that of the present invention is produced in the low-revolution area, and the drag torque that is larger than the drag torque according to the present invention is produced even in the high-revolution area.

Figure 8:
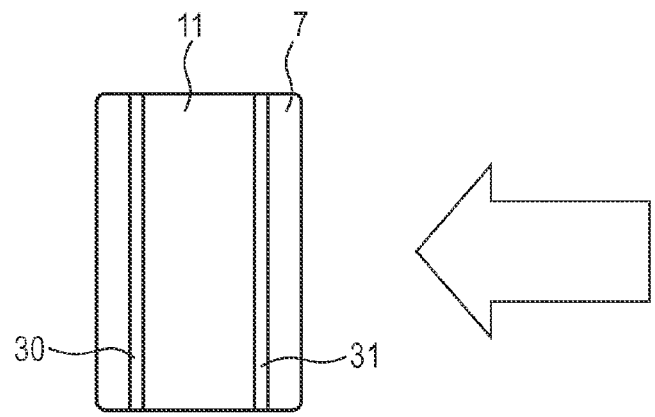
FIG. 8 is a view showing an example of a groove pattern formed on a bearing surface of the block bearing of the roller type one-way clutch according to the present invention.
Figure 9:
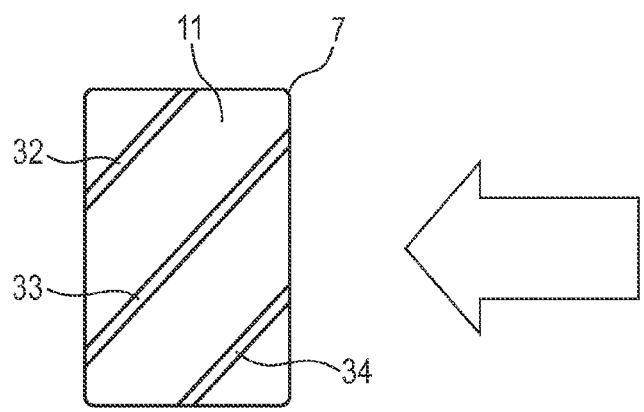
FIG. 9 is a view showing another example of the groove pattern formed on the bearing surface of the block bearing of the roller type one-way clutch according to the present invention.
Figure 10:
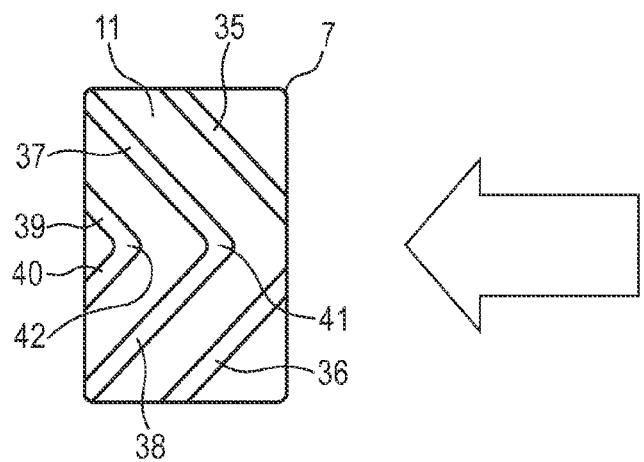
FIG. 10 is a view showing still another example of the groove pattern formed on the bearing surface of the block bearing of the roller type one-way clutch according to the present invention.

FIG. 8 to FIG. 10 are views showing examples of a groove pattern formed on the bearing surface of the block bearing of the roller type one-way clutch according to the present invention. In each of FIG. 8 and FIG. 9, an arrow shows a direction along which the oil (the lubricant) flows. In the groove pattern shown in FIG. 8, two grooves 30 and 31 are formed on the bearing surface 11 to be parallel to the axial direction. The grooves 30 and 31 run from one end to the other end of the bearing surface 11 of the block bearing 7 in the axial direction (a direction substantially orthogonal to the direction along which the oil flows). Further, widths of these grooves are the same from the one end to the other end.

In the groove pattern shown in FIG. 9, three grooves 32, 33, and 34 are formed on the bearing surface 11 at a predetermined angle relative to the axial direction. The grooves 32, 33, and 34 are parallel to each other and arranged at equal intervals. As shown in FIG. 9, the grooves 32 and 34 run from one end in the axial direction to one end in the circumferential direction of the bearing surface 11, and the groove 33 runs from one end in the circumferential direction to the other end in the circumferential direction of the bearing surface 11. The respective grooves 32, 33, and 34 have the same width.

In the groove pattern shown in FIG. 10, although a plurality of grooves are formed on the bearing surface 11, they are formed into a wedge shape extending in the direction along which the oil flows as a whole. As shown in FIG. 10, three grooves 35, 37, and 39 parallel to each other are formed in a half region of the bearing surface 11 of the block bearing 7 in the axial direction at the same angle relative to the axial direction. Furthermore, three grooves 36, 38, and 40 parallel to each other are formed in the other half region of the bearing surface 11 in the axial direction at the same angle relative to the axial direction.

As obvious from FIG. 10, the grooves 35, 37, and 39 are substantially orthogonal to the grooves 36, 38, and 40, respectively. Moreover, the widths of the respective grooves 35, 37, and 39 are the same as the widths of the respective grooves 36, 38, and 40. The groove 35 and the groove 36 run from one end portion in the axial direction to one end portion in the circumferential direction of the bearing surface 11, respectively. They have a relationship that they are orthogonal to each other at a position that is out of the bearing surface 11.

The groove 37 and the groove 38 are opened at corner portions of the being surface 11, respectively, orthogonal to each other, and coupled at a curved portion 41 placed at a substantially intermediate position in the axial direction. Additionally, the groove 39 and the groove 40 are opened in one end portion in the circumferential direction, respectively, and coupled with each other at a curved portion 42. Therefore, the grooves 37 and 38 run from the corner portion to the other corner portion of the bearing surface 11.

As shown in FIG. 8 to FIG. 10, when the plurality of grooves are provided on the bearing surface 11 of the block bearing 7, the oil that flows in from the arrow direction flows out to the end portion in the axial direction or the circumferential direction. Therefore, in addition to the effect provided by setting the curvature of the bearing surface 11 of the block bearing 7 to be larger than the curvature of the inner peripheral surface 16 of the inner race 2, the shearing resistance of the oil can be further reduced.

The above-described groove patterns include the plurality of grooves, but the number of the grooves does not necessarily have to be the illustrated numbers, and a single groove or three or more grooves may be formed. Further, In FIG. 8 to FIG. 10, although the grooves are all straight, but curved grooves may be formed. Furthermore, although the respective grooves have the same width, it is possible to form grooves having different widths. The widths of the grooves can be partially changed.

In FIG. 1, the four sets of the rollers 6 and the springs 5 are arranged between the block bearings 7, but it is needless to say that any number of sets other than four can be provided. That is, the set number that is smaller or higher than four may be set.

In the foregoing embodiment, although the cam surface 17 that meshes with each roller 6 is provided on the inner peripheral surface of the outer race 1, but the cam surface may be provided on the outer peripheral surface 16 of the inner race 2.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-187469, filed Sep. 10, 2013, which is hereby incorporated by reference herein in its entirety.

What is claimed is:

1. A roller type one-way clutch comprising:
an outer race;
an inner race that is apart from the outer race on an inner diameter side in a radial direction and concentrically arranged to allow its relative rotation;
a plurality of rollers that are arranged between the outer race and the inner race and transmit a torque between the outer race and the inner race; and
a plurality of block bearings that are arranged between the rollers and between the outer race and the inner race,
wherein an outer peripheral surface of the inner race is formed as a curved surface with a predetermined curvature in a circumferential direction and a bearing surface of the block bearing is formed as a curved surface with a predetermined curvature in the circumferential direction, and wherein the curvature in the circumferential direction of the bearing surface of the block bearing facing the outer peripheral surface of the inner race is larger than the curvature in the circumferential direction of the outer peripheral surface of the inner race.

2. The roller type one-way clutch according to claim 1, wherein the curvature in the circumferential direction of the bearing surface of the block bearing facing the outer peripheral surface of the inner race is double to quintuple the curvature in the circumferential direction of the outer peripheral surface of the inner race.

3. The roller type one-way clutch according to claim 1, wherein a groove is formed on the bearing surface of the block bearing.

4. The roller type one-way clutch according to claim 3, wherein a plurality of grooves are formed.

5. The roller type one-way clutch according to claim 4, wherein the plurality of grooves are extended to be parallel in an axial direction.

6. The roller type one-way clutch according to claim 4, wherein the plurality of grooves are parallel to each other and formed at a predetermined angle in the axial direction.

7. The roller type one-way clutch according to claim 4, wherein each of the plurality of grooves is formed into a wedge form in a circumferential direction.

8. The roller type one-way clutch according to claim 1, wherein a cam surface is formed on a peripheral surface of one of the races, and the torque is transmitted when the rollers mesh with the cam surface.

\* \* \* \* \*